United States Patent [19]

Gournay

[11] 4,419,887
[45] Dec. 13, 1983

[54] DISTINGUISHING TRUE BASEMENT FROM DIKES AND SILLS ENCOUNTERED IN DRILLING OF A BOREHOLE THROUGH THE EARTH

[75] Inventor: Luke S. Gournay, Rockwall, Tex.

[73] Assignee: Mobil Oil Corporation, New York, N.Y.

[21] Appl. No.: 377,894

[22] Filed: May 13, 1982

[51] Int. Cl.³ ............................................. E21B 49/00
[52] U.S. Cl. .................................................... 73/152
[58] Field of Search .......................... 73/152; 340/860; 364/422; 367/86

[56] References Cited

U.S. PATENT DOCUMENTS 3,590,228  6/1971  Burke .................................. 364/422
4,293,933  10/1981 Park et al. ......................... 367/86 X Primary Examiner—Jerry W. Myracle
Attorney, Agent, or Firm—A. J. McKillop; M. G. Gilman; J. F. Powers, Jr.

[57] ABSTRACT

In drilling a borehole, true basement is distinguished from a dike or sill by logging the borehole with a gravimetric logging tool and with a formation density compensated logging tool. The difference between the density and the gravity, as determined by these logs is plotted as a function of depth over the interval extending above the point at which the drilling encountered the dense rock formation. The difference log so obtained distinguishes whether rock formation is true basement or a dense intrusion.

5 Claims, 18 Drawing Figures

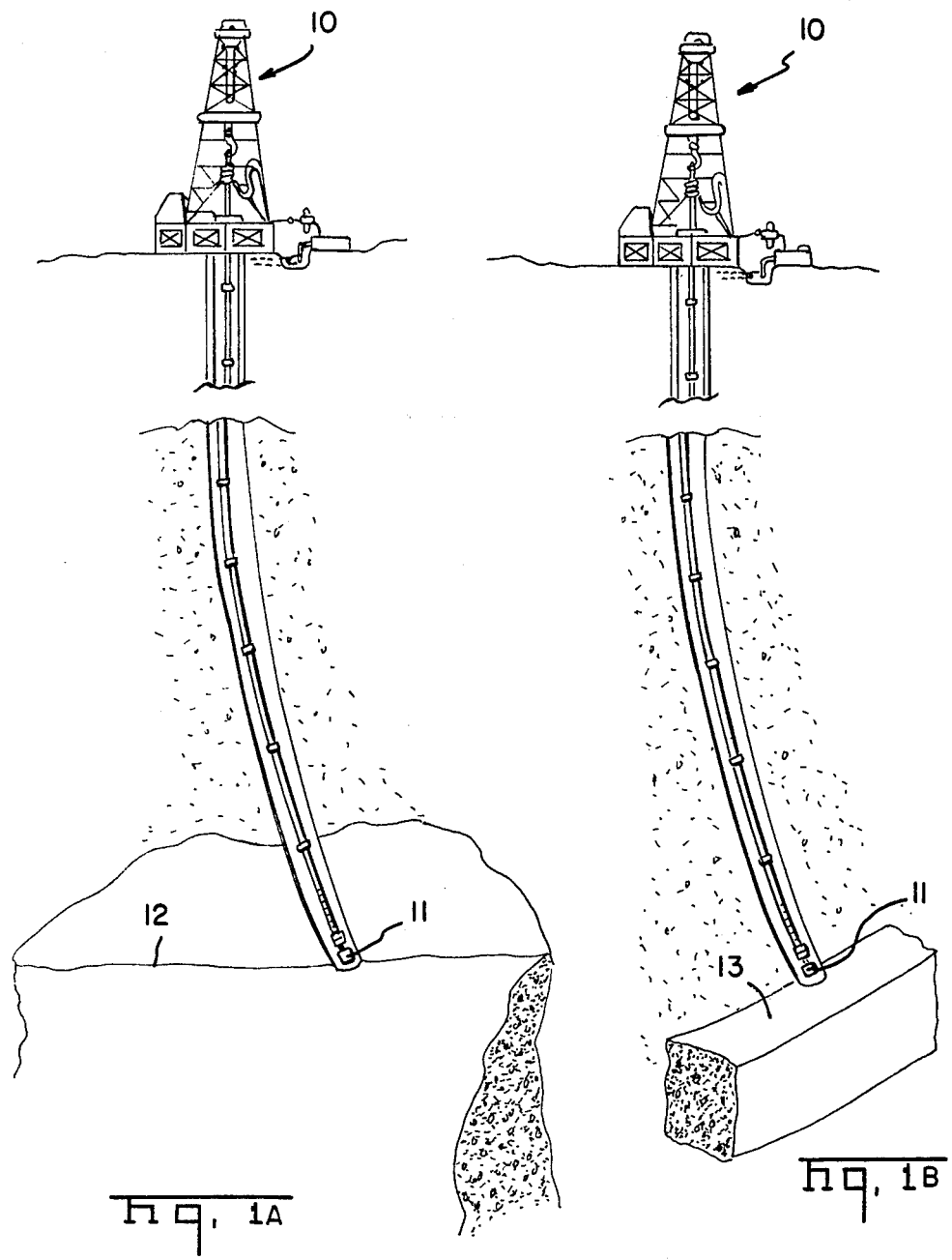

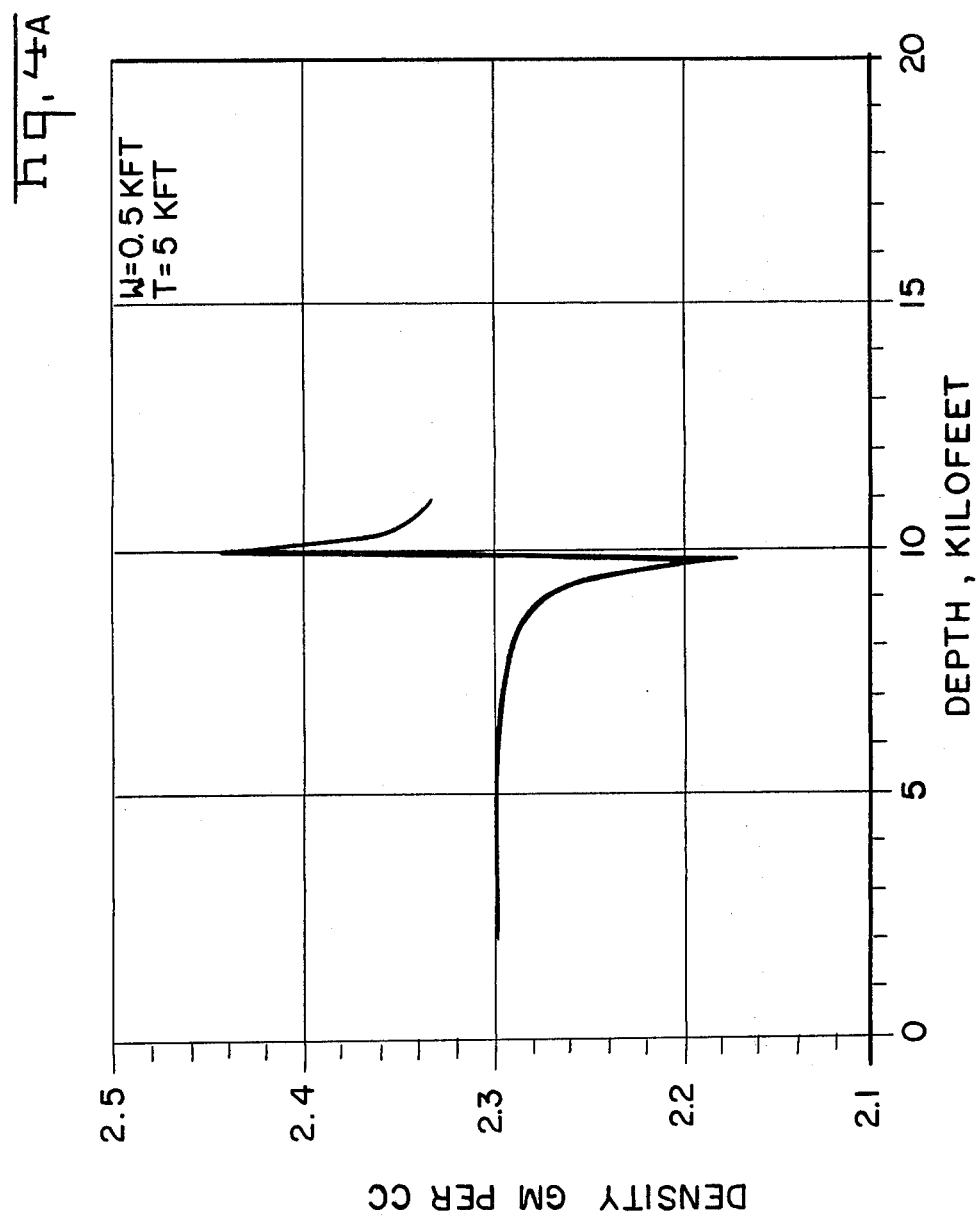

DISTINGUISHING TRUE BASEMENT FROM DIKES AND SILLS ENCOUNTERED IN DRILLING OF A BOREHOLE THROUGH THE EARTH

BACKGROUND OF THE INVENTION

This invention relates to the logging of a borehole to distinguish true basement from dikes and sills encountered in the drilling of the borehole.

Sills and dikes are a category of plutons that are occasionally encountered while drilling a borehole through the earth. While the bit is in the pluton it is difficult, time consuming and expensive to distinguish between this geologic feature and true basement. Current methods used to differentiate between a sill or dike and basement include radiometric dating of the intrusive body to compare its age against Cambrian or Pre-Cambrian basement, and comparison of the intrusion's mineralogy with that of basement if the latter is known. If true basement has been encountered, of course, the drilling must be discontinued.

On the other hand, if a dike or sill has been encountered it may be possible to drill through the formation. If the dense rock of this intrusion is part of a dike or sill, it is important that drilling be continued through the intrusion. Such dense intrusions form a cap for the sedimentary rocks below and hydrocarbons are often found below these caps.

Since the drilling of deep boreholes is an extremely expensive operation, it is important that the decision as to whether or not to continue drilling be based upon the best available information. Logging tools have been successfully used to provide good information about the formations surrounding the borehole. Gamma ray, sonic, and neutron logs, for example, have been obtained from boreholes being drilled and these logs are very useful in determining whether or not drilling should be continued. These logs are not very useful in determining whether the drilling has encountered true basement. The reason is that these logging tools have a radius of investigation which is no more than a few feet surrounding the borehole. These logs provide an excellent determination of, for example, density of the formations immediately surrounding the borehole. However, the density surrounding the borehole will be the same whether true basement, or an intrusion of the same density has been encountered.

Recently, borehole gravimeter logging has been developed. Reliable borehole gravimetric techniques provide an indication of the bulk density of rock 50 feet or more from the bore of the hole being logged. While gravimetric logs indicate formation bulk density at great distances from the borehole, they frequently are not true indicators of whether true basement or a dense intrusion has been encountered while drilling. The reason is that ambiguities in gravimetric log interpretation sometimes obscure sills or dikes from true basement.

It is an object of the present invention to provide a logging technique which reliably distinguishes true basement from a sill or dike encountered during the drilling of a borehole.

SUMMARY OF THE INVENTION

In accordance with the present invention, a good indication of whether true basement has been encountered in drilling is obtained by plotting a log, in a common measurement, of the difference between true gravity and density over a depth interval extending above the point at which the drilling encounters the rock formation. For example, the difference between true gravimetric gradient, as determined by a gravimetric log, and density derived gravimetric gradient, as determined from a density log, is plotted. Alternatively, gravimetric gradient is converted to the common measurement of density and the difference between this and the density log is obtained and plotted.

It is an object of the present invention to provide a logging technique which produces logs on which true basement is distinguished from intrusive sills and dikes without ambiguity.

The foregoing and other objects, features and advantages of the invention will be better understood from the following more detailed description and appended claims.

SHORT DESCRIPTION OF THE DRAWINGS

FIGS. 1A and 1B depict drilling operations in which the drill bit has encountered true basement and an intrusive sill, respectively;

FIG. 3 depicts the logging, in accordance with the present invention, of an intrusive sill;

FIGS. 3A and 3B show the dimensions of exemplary formations;

Figure 4:
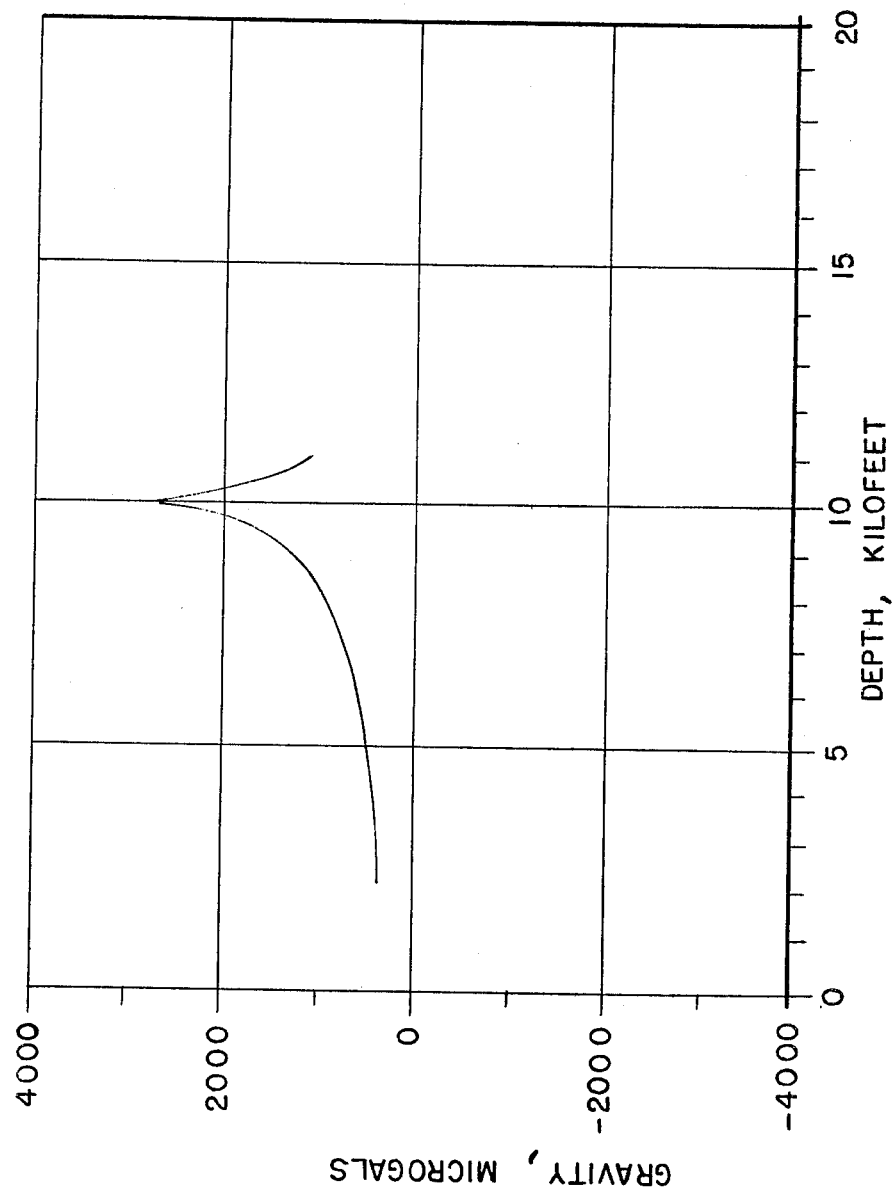
Figure 7:
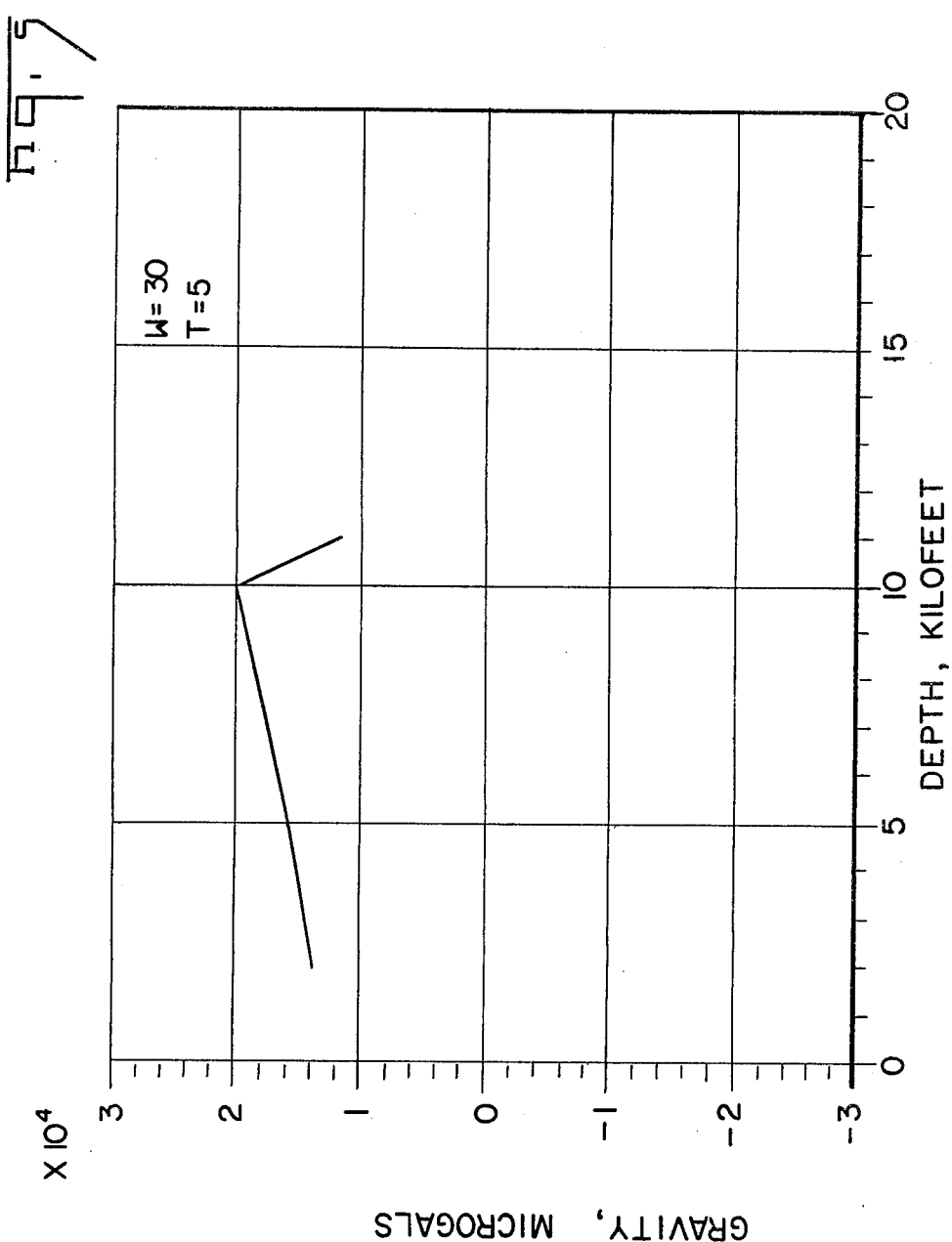
Figure 7A:
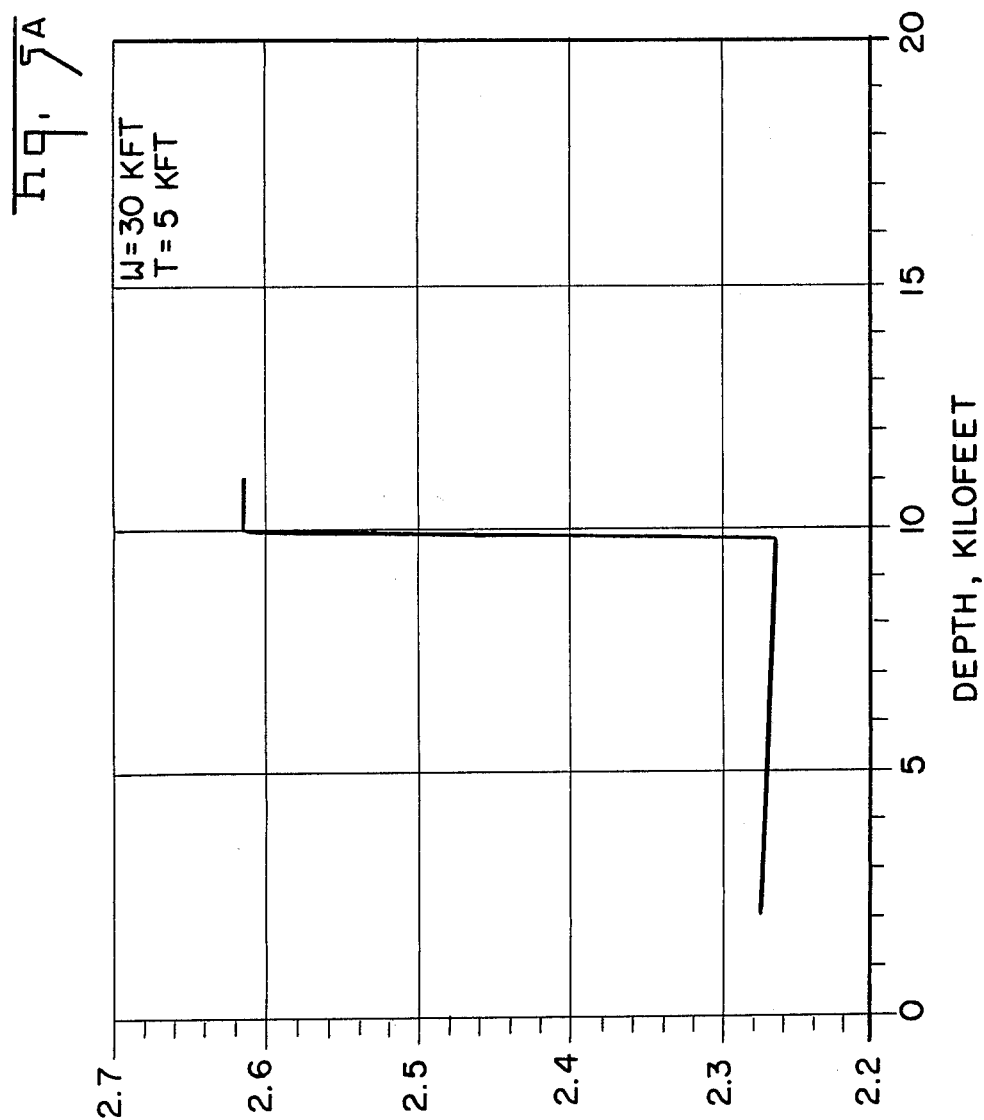
Figure 9:
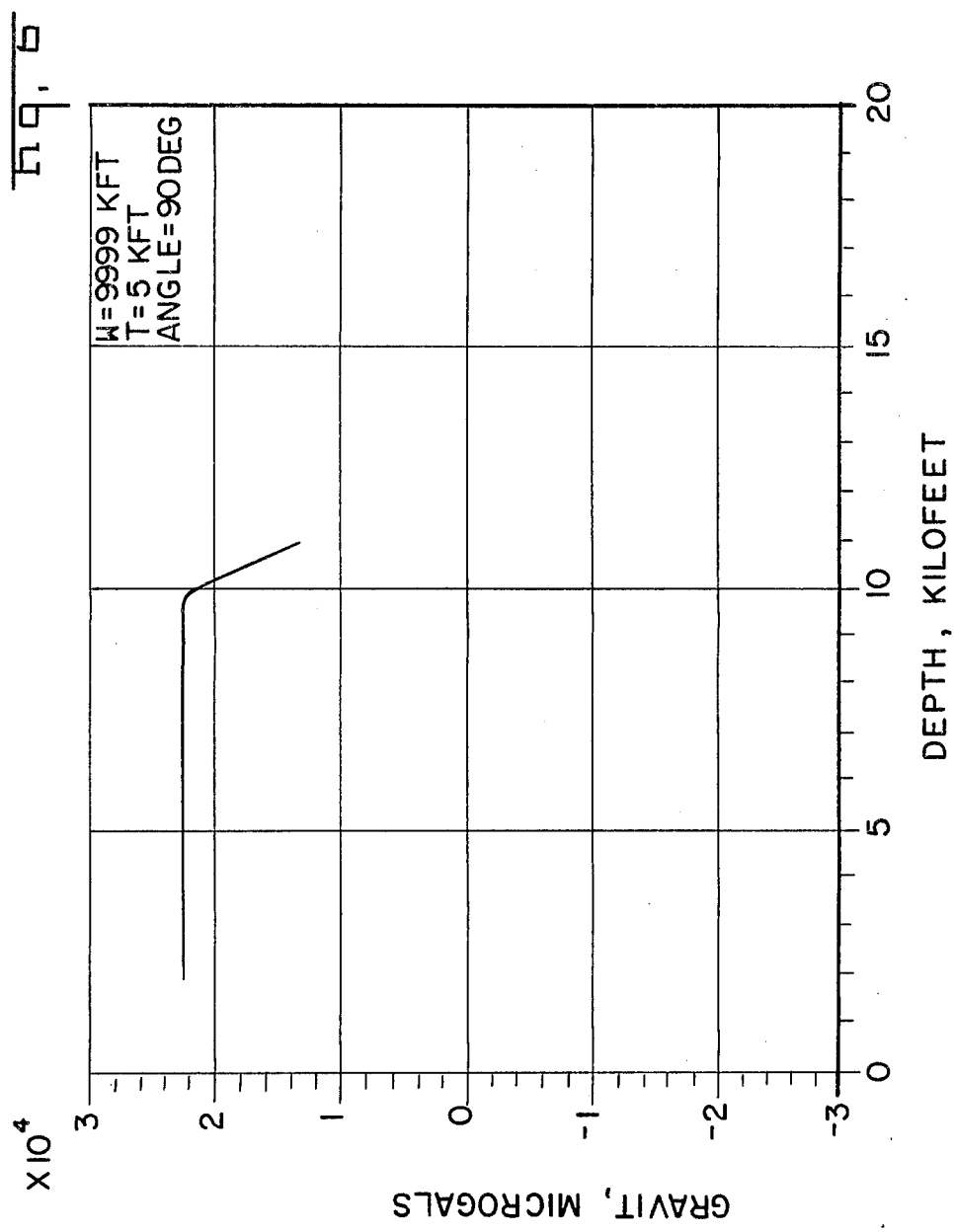
Figure 6A:
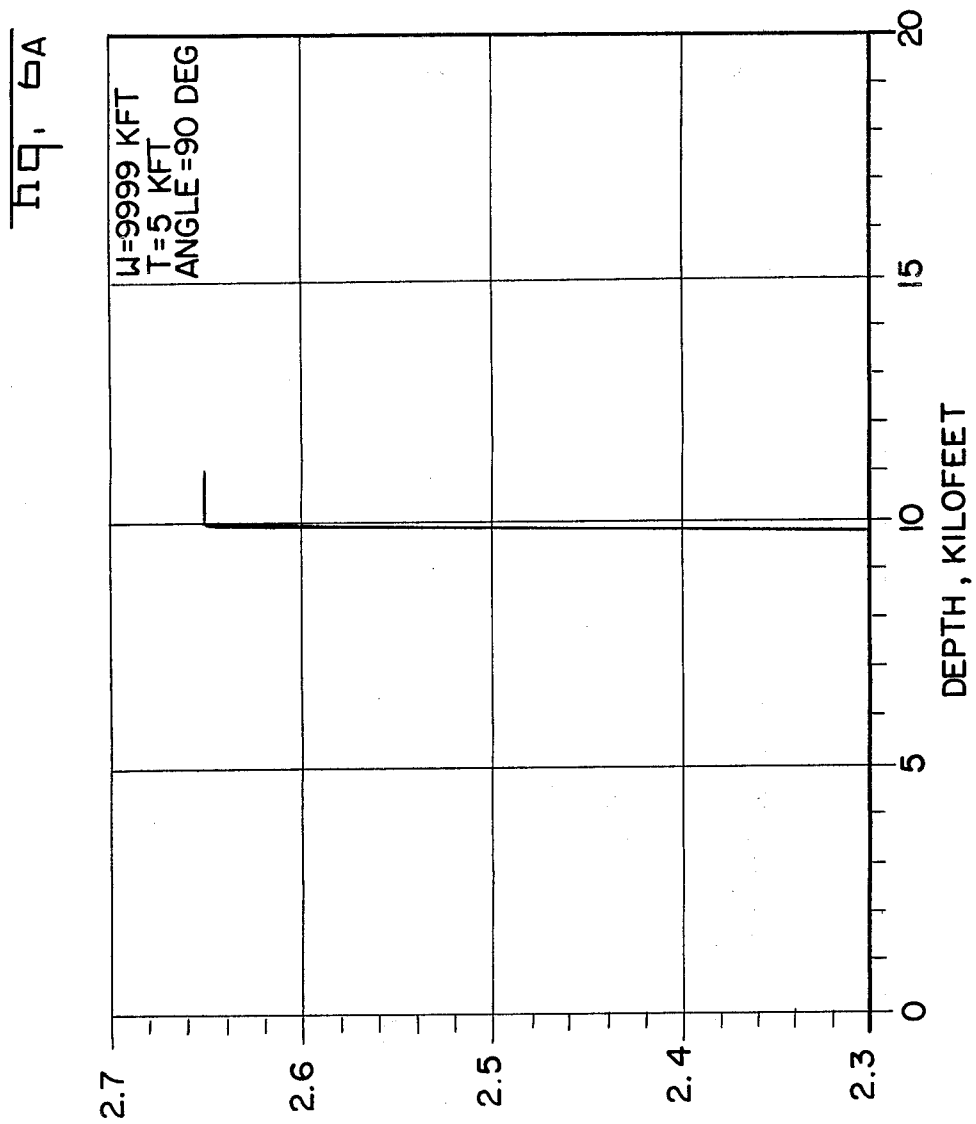
Figure 7:
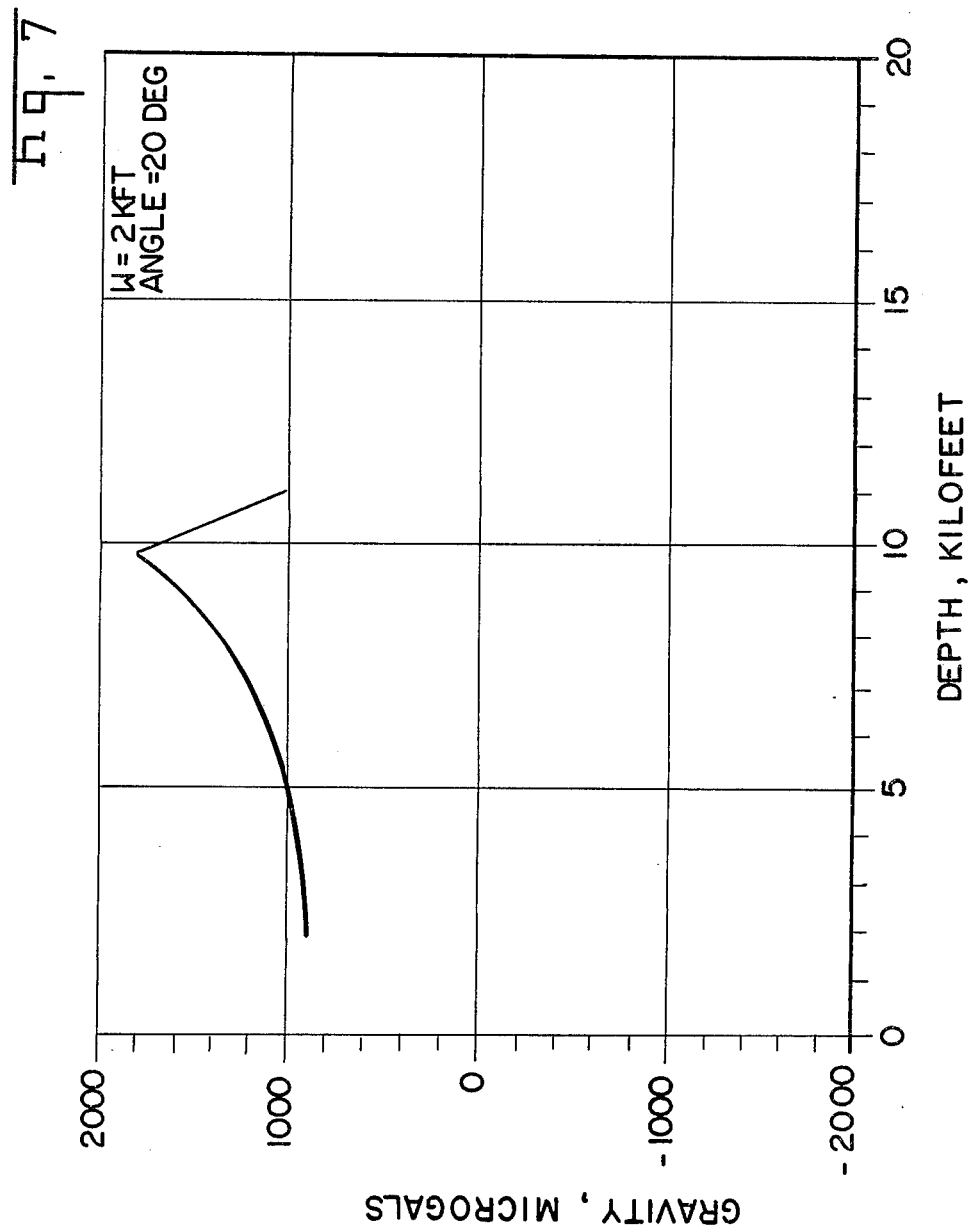
Figure 8:
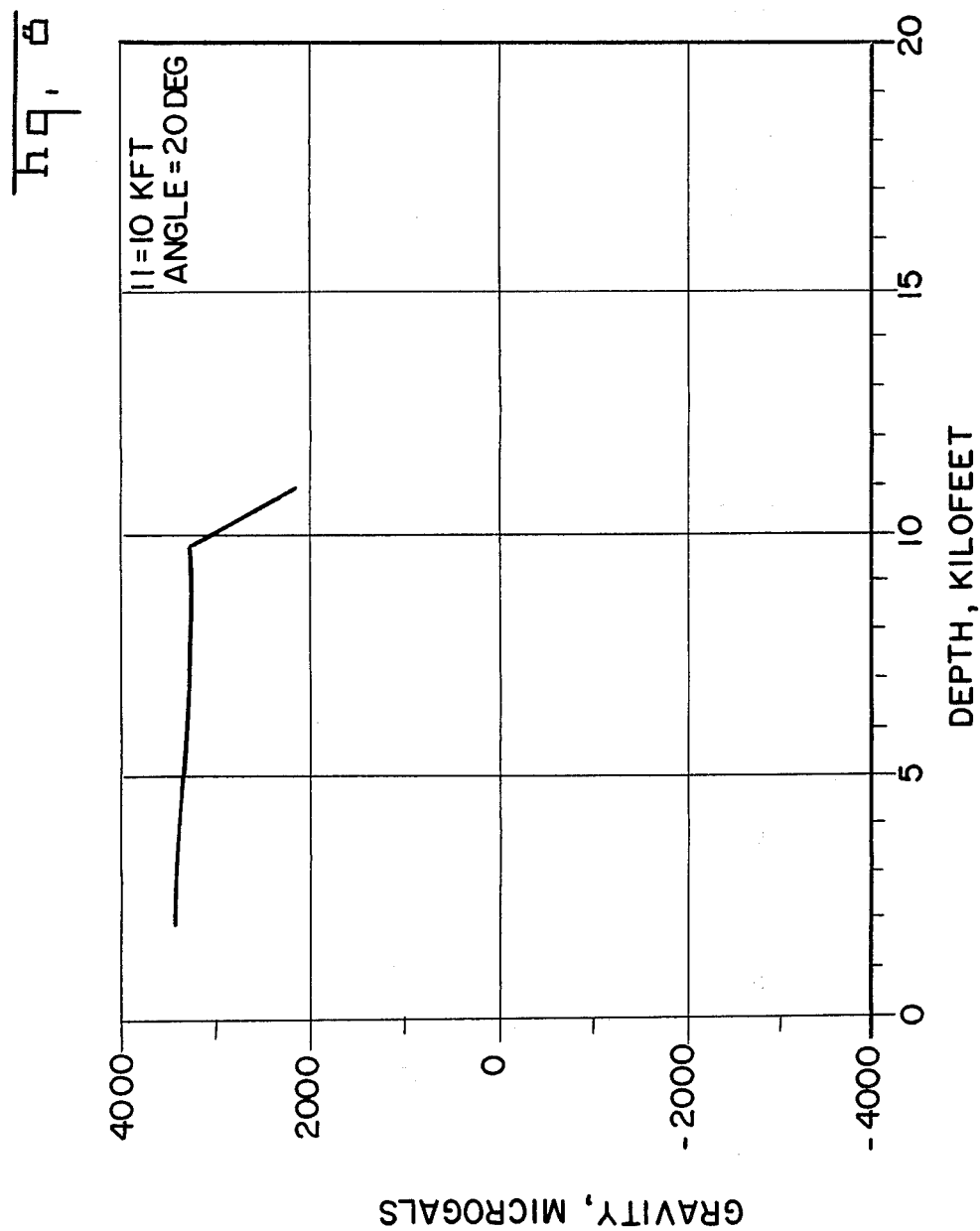
Figure 9:
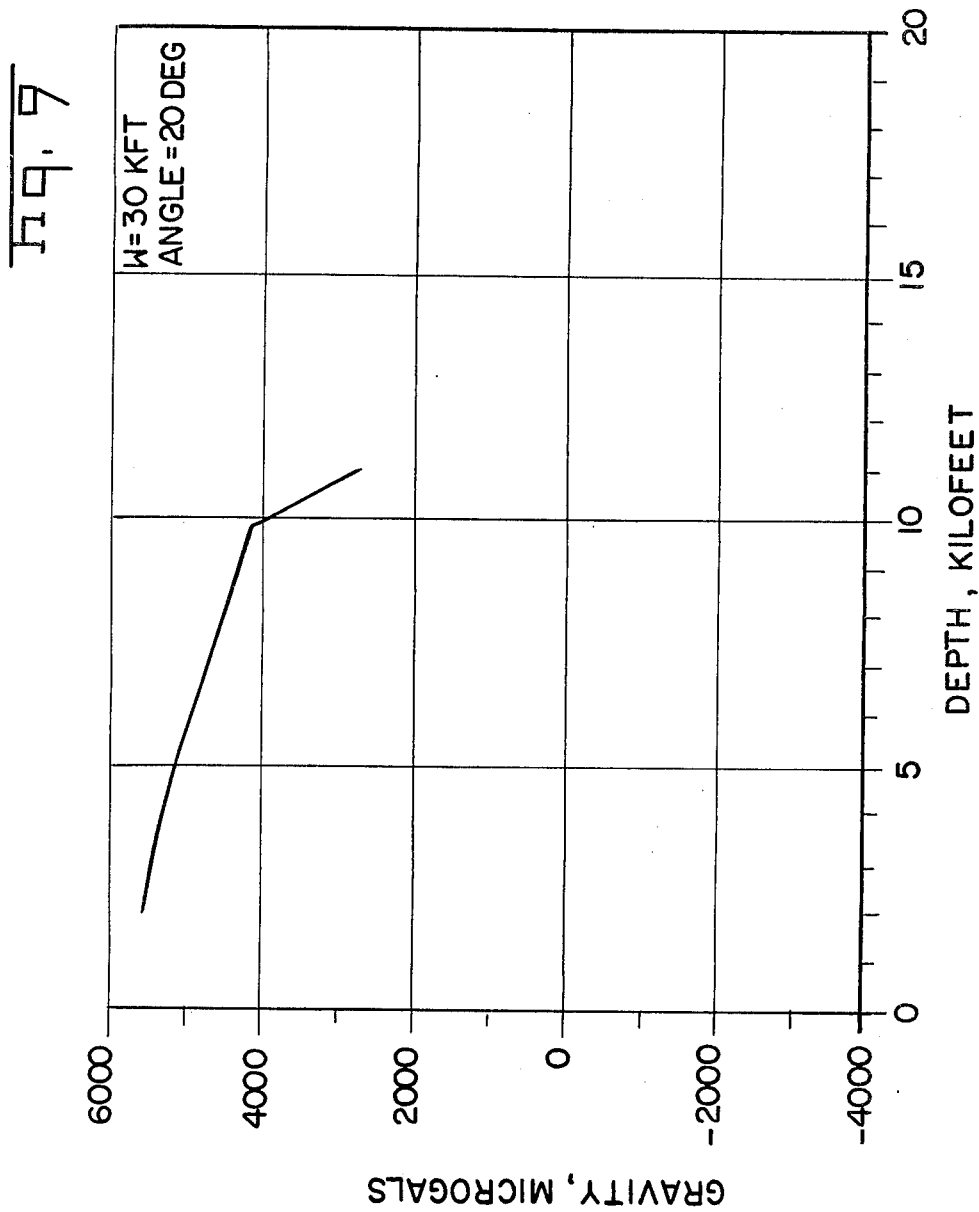
Figure 10:
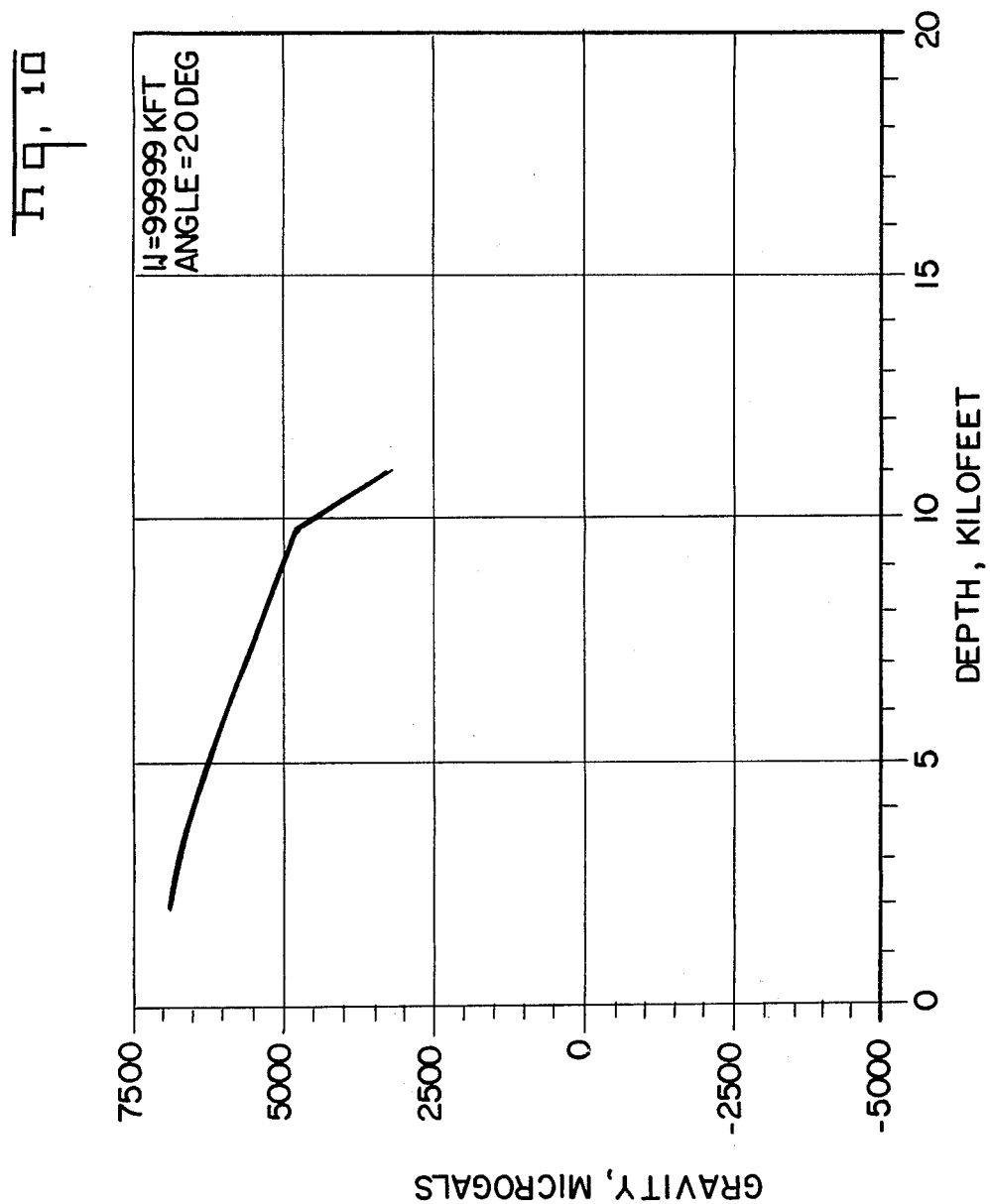
Figure 11:
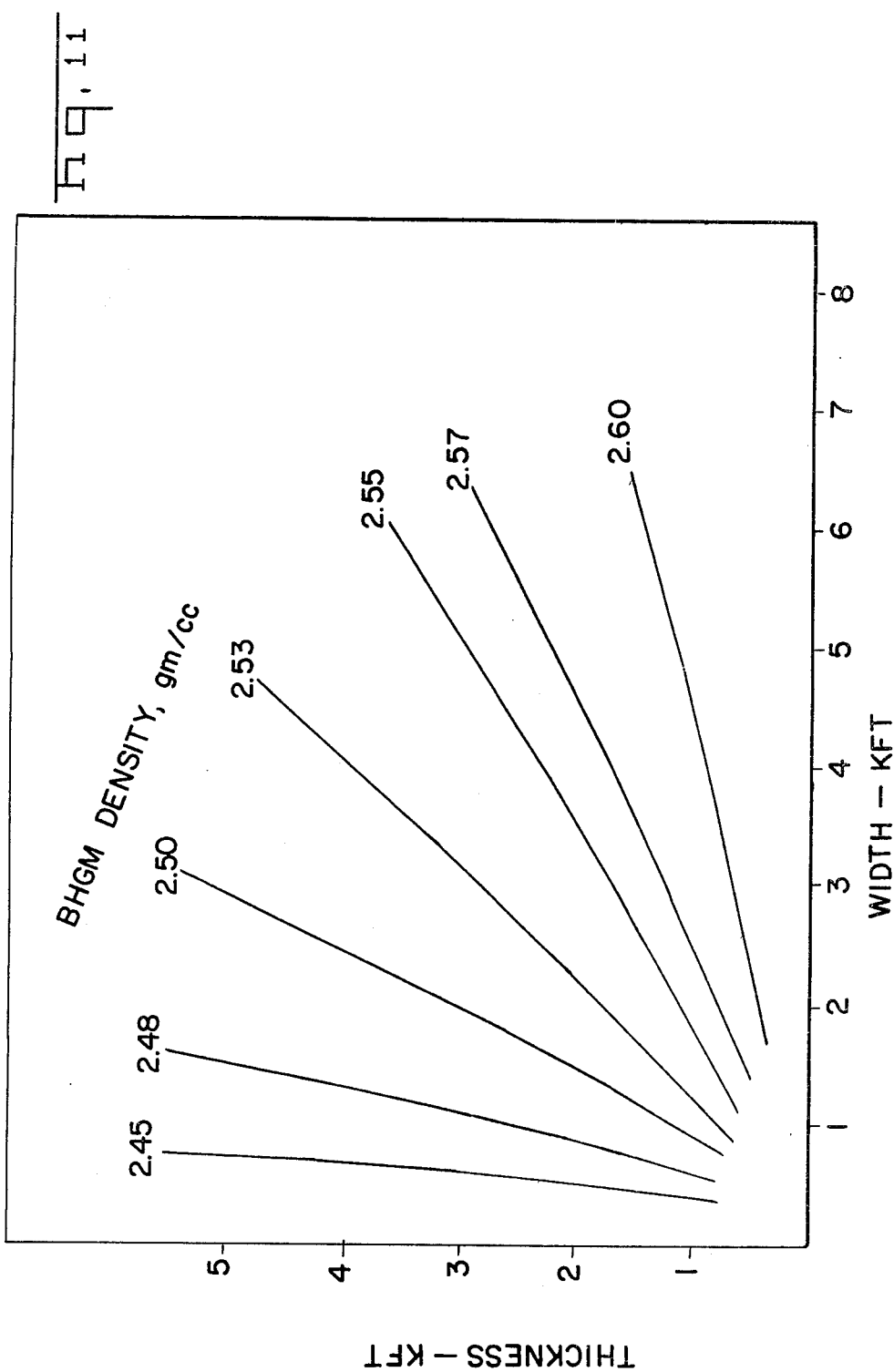

FIGS. 4–10, including FIGS. 4a, 5a and 6a are logs which depict the operation of the invention on exemplary formations; and FIG. 11 demonstrates the ambiguity inherent in gravimetric measurements of formations having different thickness and width.

DESCRIPTION OF THE PREFERRED EMBODIMENT

FIG. 1A depicts the drilling of a borehole through the earth by the drill rig 10. In this case, the drill bit 11 has encountered very dense basement rock 12. In FIG. 1B the drill bit 11 has encountered an igneous intrusion 13 such as a sill. It is generally desirable to drill through such intrusions, because they often cap hydrocarbons trapped in the sedimentary rock below. However, it is extremely difficult to distinguish these two situations where the density of the rock in both cases may be approximately the same. Conventional logging techniques define the density of the rock immediately surrounding the borehole, but they are not useful in delineating the shape of the formation.

Figure 2A:
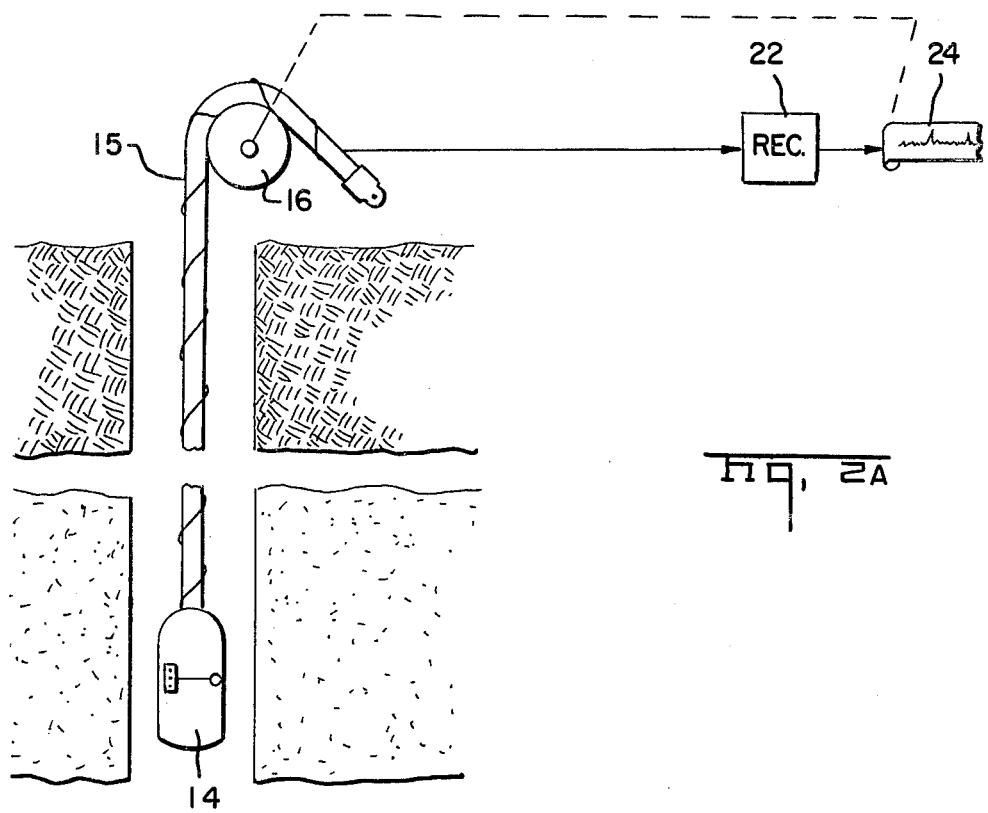
FIGS. 2A and 2B depict borehole gravimetric logging and formation density logging operations, respectively.

Good delineation of the nature of the formation can be obtained in accordance with the present invention by logging the borehole to obtain a gravimetric log and a formation density compensated (FDC) log. As shown in FIG. 2A gravimetric logging tool 14 traverses the borehole by means of cable 15 running over sheave 16. The tool traverses the borehole in the depth interval extending above the point at which drilling encountered the rock formation of interest. Gravimetric measurements made at spaced locations over this interval are recorded on recorder 22 to produce a log 24 of gravity measurements as a function of depth. This is a log of true gravity over the depth interval of interest.

Figure 2B:
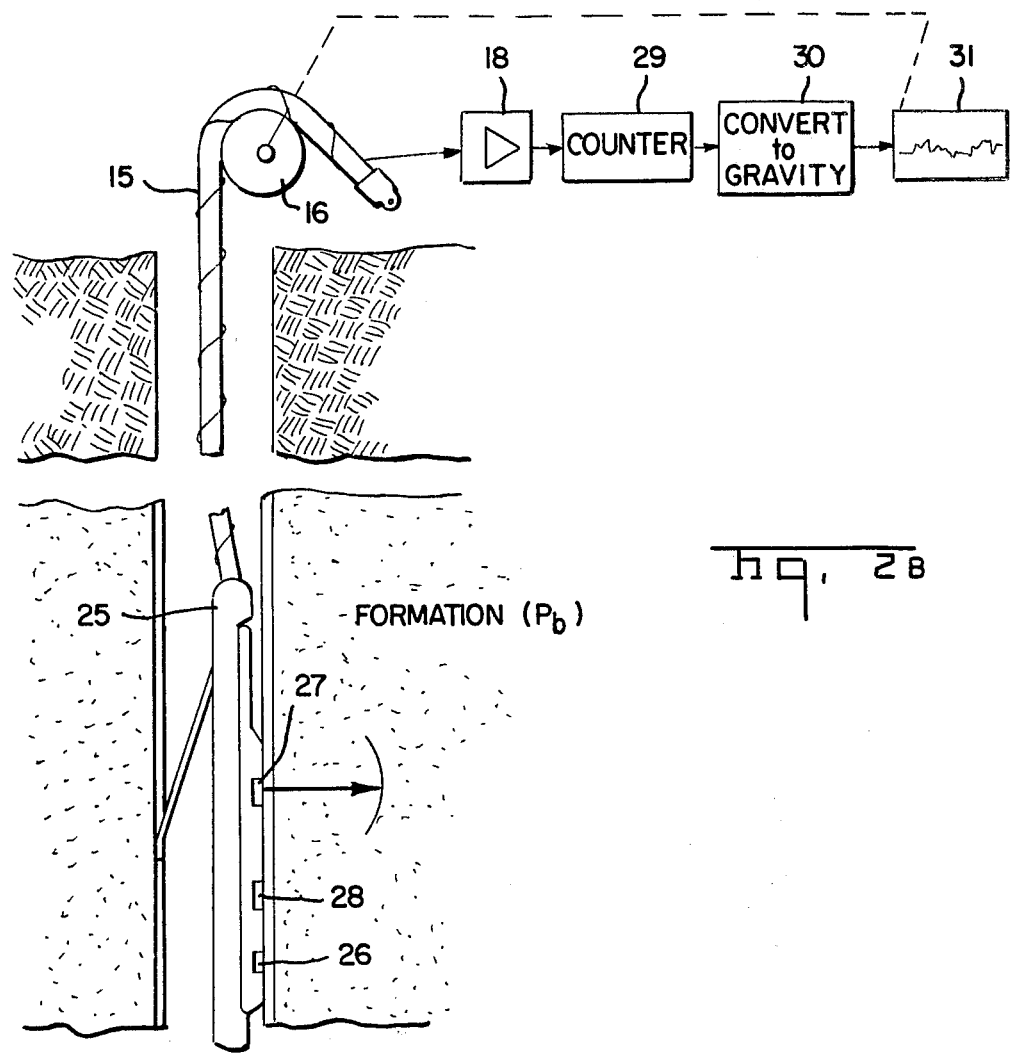
Figure 7:
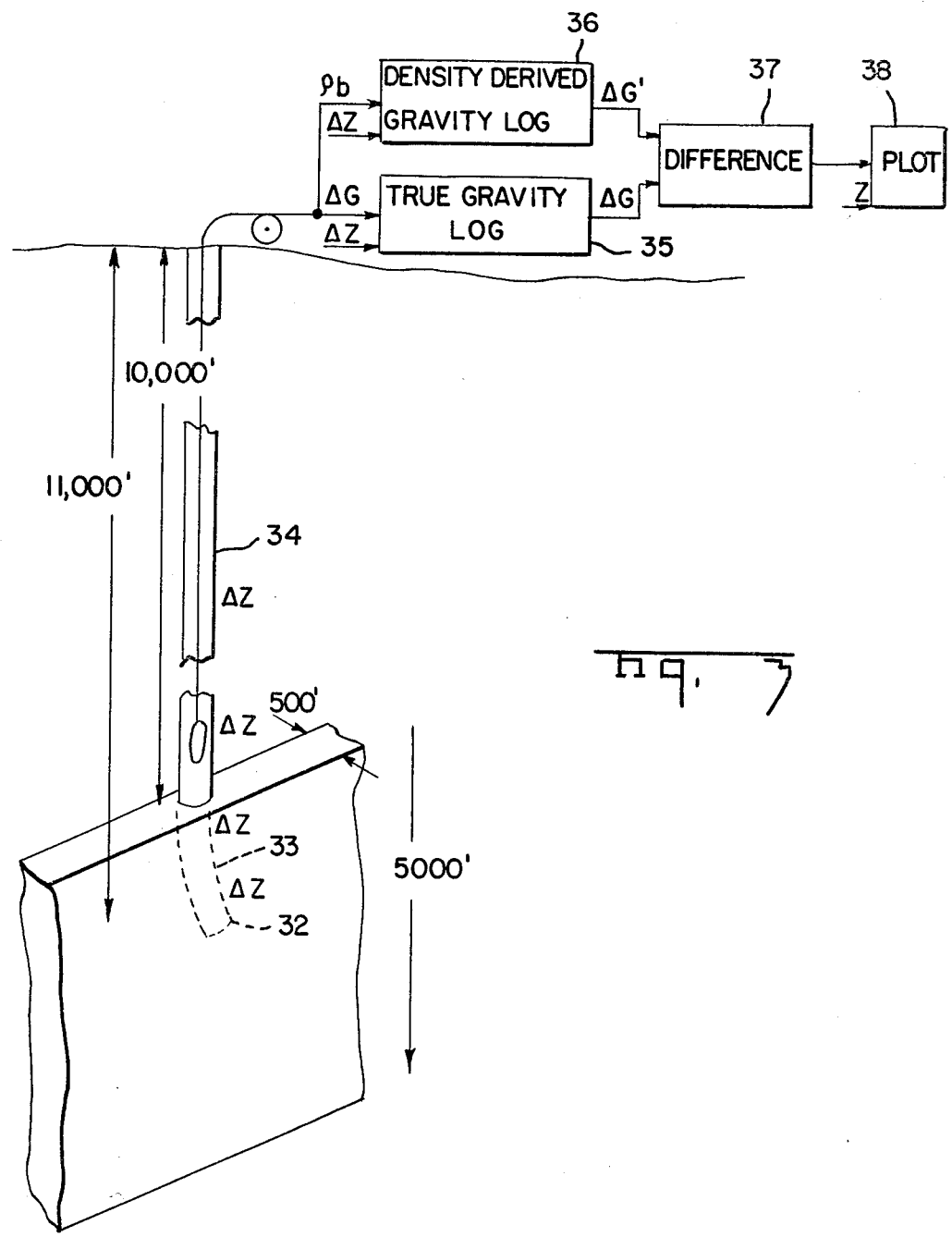
Figure 7A:
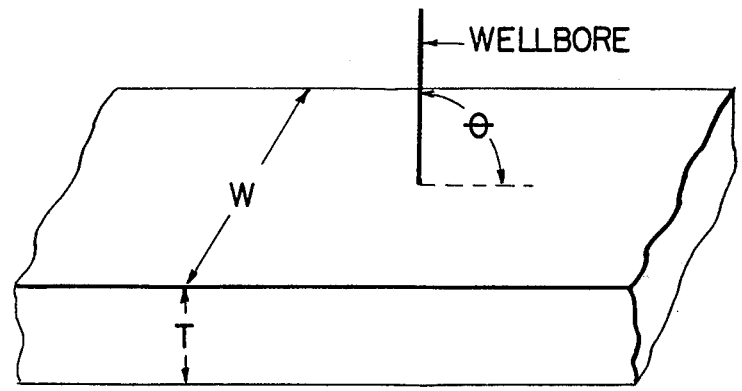
Figure 7B:
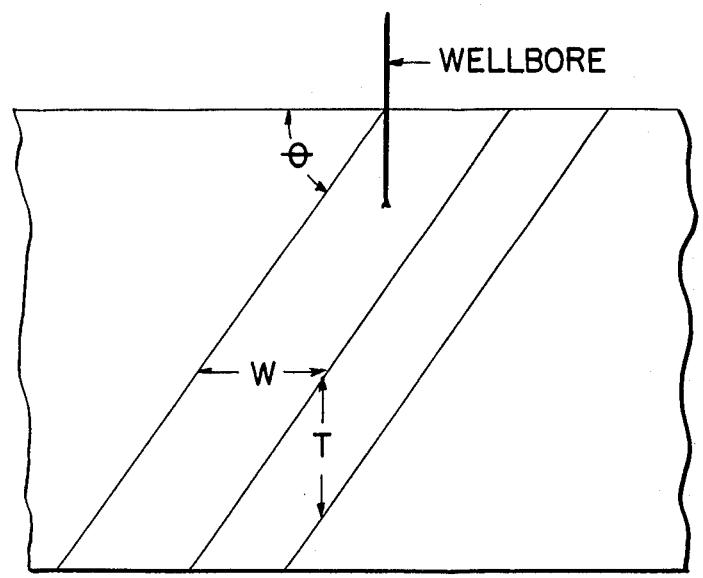

FIG. 2B depicts logging the same depth interval with a density logging tool. As an example, a gamma-gamma logging tool such as described in Schlumberger Log Interpretation, Vol. I-Principles, 1972 ed., pp. 40-48, can be used.

Density logging tool 25 includes a source of gamma rays 26, a long spacing detector 27, and a short spacing detector 28. Source 26 emits gamma rays which collide with the electrons in the formation. At each collision, a gamma ray loses some, but not all, of its energy and then continues with diminished energy in a reaction referred to as "Compton scattering." The scattered gamma rays reaching the detectors 27 and 28 are counted to indicate formation density. At the surface, the detected signal from amplifier 18 is applied to counter 29 which produces an output indicating density at each of a plurality of spaced locations over the depth interval being logged. These outputs are converted into values of density derived gravity as a function of depth over this interval as indicated at 30 in FIG. 2B. The values of density are converted to gravity in accordance with:

$$\rho_b = \frac{F - (\Delta g/\Delta Z)}{4\pi G}$$

where
F is the free air gradient;
$\rho b$ is the density;
$\Delta g$ is the gravity difference between two adjacent locations at which measurements are taken;
$\Delta Z$ is the vertical distance between adjacent locations; and
G is the universal gravitational constant.

Written in units of microgals (one gal=1 cm/sec$^2$) for $\Delta g$, gm/cc for $\rho b$, and feet for $\Delta Z$, we have $$\rho b = 3.687 - 0.039185 \, \Delta g/\Delta Z$$

The result is a log 31 of density derived gravity $\Delta g$ as a function of depth over the interval of interest.

The foregoing operations are summarized in FIG. 3 which shows as an example that the drilling encountered a sill at 10,000 feet and the drilling was continued into the sill and stopped at 11,000 feet. Thereafter, density and gravity logs were obtained at the spaced locations 32, 33 . . . 34 over the interval of interest, each station being spaced from an adjacent station by $\Delta Z$. The gravimetric measurements at each of these locations are converted into a log of true gravity versus depth as indicated at 35 and the measurements of density are converted into a log of density derived gravity as a function depth as indicated at 36. The difference between these two logs is obtained as indicated at 37 and this difference is plotted as a function of depth as indicated at 38.

Alternatively, the true gravity from the gramimetric log can be converted to bluk formation density. This gravity derived density provides an alternate and in many cases, better, approach for differentiating between the two geologic events in question.

FIGS. 3A and 3B show the dimensions used in a computer model of a geologic formation which was used to simulate the operation of the invention. An igneous intrusion of density 2.65 gm/cc was assumed to penetrate sediments with a typical average density of 2.30 gm/cc. The shape of this intrusion is shown in FIG. 3A. In the first set of analyses the intrusion is assumed horizontal, i.e., the angle $\theta$ is 90°, it is bounded in width and thickness, but is semi-infinite in length. In the second analysis the sill or dike is viewed at various angles from the vertical and its length is bounded by the earth's surface and an assumed basement at 30,000 feet.

This configuration is shown in FIG. 3B. In both analyses, the borehole intercepted the center of the sill or dike at a depth of 10,000 feet.

In the first example, the sill was assumed to have a width W of 0.5 kilofeet and a thickness T of 5 kilofeet. The difference log follows closely the plot shown in FIG. 4. This clearly distinguishes the formation of interest as being a sill. FIG. 4A shows a log of the difference between true density and gravity derived density that would result from the same gravity and density measurements of FIG. 4. Note the effects of gravitational perturbation by the finite dimensional intrusion. Above its top edge (10,000 feet in this example) the gravity derived density drops below sediment density to a low value of 2.172 gm/cc. The difference between true density and gravity derived density would be 0.128 gm/cc at this point —a factor of 13 greater than gravity meter sensitivity. Upon entering the intrusion, the difference density is more striking: 0.21 gm/cc. These effects are symmetrical about the body's center.

In this example, the difference log would be a straight line if true basement had been encountered at 10,000 feet. This condition is approached in the model of an intrusion whose width is 30,000 feet and thickness is 5,000 feet. FIG. 5 shows the difference log in the common measurement of gravity and FIG. 5A shows the difference log in the common measurement of density for this case. Gravity vs. depth is approaching a constant value while density is less disturbed and approaches the true value. The extreme case of semi-infinite width is shown in FIGS. 6 and 6A; this result is independent of thickness.

Intrusions of the same density contrast as before were examined at angles of 20 and 60 degrees from the vertical. For all these cases the thickness was kept at 2,000 feet, but the width was a variable.

The difference logs for a 20 degree angle are shown in FIGS. 7 through 10 as we see the width go from 2,000 feet to a semi-infinite slab.

In these examples, the maximum density derived from gravimetric measurements remains constant within the intrusion as the width was varied. Also, in all cases it is significantly less than the true density of 2.65 gm/kc that would be measured by a density log. These data are summarized in Table 1.

TABLE 1

| INTRUSION ANGLE = 20 DEGREES | | |
|---|---|---|
| WIDTH, Kft. | MAXIMUM BHGM DENSITY, Gm/cc | $\rho_{(FDC)} - \rho_{(BHGM)}$ Gm/cc |
| 2 | 2.33 | 0.32 |
| 10 | 2.34 | 0.31 |
| 30 | 2.35 | 0.30 |
| 99999 | 2.35 | 0.30 |

We conclude that a sill or dike of this type (and these are the most common) could easily be differentiated from true basement through combined use of gravimetric and density logs.

The borehole gravity meter has been successfully used to determine bulk formation density. This bulk density from borehole gravity meter data by itself can be used to differentiate between two geologic events. However, there is some ambiguity present. By making computations for numerous different combinations of thickness and width we can derive a family of isodensity curves which display ambiguity. We will define isodensity as the maximum density value recorded by the borehole gravity meter—this occurs at the upper edge of the intrusion. This family of curves is given in FIG. 11. As an example, the isodensity value of 2.50 gm/cc is common to combinations like (W=3, T=5.25), (W=2, T=3.12), (W=1, T=1.13) etc.

While a particular embodiment of the invention has been shown and described, various modifications are within the true spirit and scope of the invention. The appended claims, are, therefore, intended to cover all such modifications.

What is claimed is:

1. In the drilling of a borehole in the earth, the method of determining whether a rock formation encountered by said drilling is true basement or a dense intrusion comprising:
   traversing said borehole with a density logging tool in a depth interval extending above the point at which drilling encountered said rock formation;
   measuring the density of the formation surrounding the borehole as a function of depth over said depth interval;
   traversing said borehole with a gravimetric logging tool;
   measuring true gravity as a function of depth over said depth interval;
   converting said density and said true gravity to a common measurement;
   determining the difference between said density and said true gravity in said common measurement over said depth interval; and
   plotting a log of said difference on which true basement is distinguished from intrusive sills and dikes.

2. The method recited in claim 1 wherein the measurement of density is converted to density derived gravity, wherein the difference between said density derived gravity and said true gravity is determined and wherein said log is plotted in the common measurement of gravity.

3. The method recited in claim 1 wherein the measurement of true gravity is converted to gravity derived density, wherein the difference between said gravity derived density and said density is determined and wherein said log is plotted in the common measurement of density.

4. The method recited in claim 1 wherein density and gravity are measured at a plurality of spaced locations over said depth interval.

5. The method recited in claim 4 wherein density and true gravity are converted to a common measurement in accordance with the relationship:

$$\rho_b = \frac{F - (\Delta g/\Delta Z)}{4\pi G}$$

where
F is the free air gradient;
$\rho b$ is the density;
$\Delta g$ is the gravity difference between two adjacent locations at which measurements are taken;
$\Delta Z$ is the vertical distance between adjacent locations; and
G is the universal gravitational constant. Written in units of microgals (one gal=1 cm/sec$^2$) for $\Delta g$, gm/cc for $\rho b$, and feet for $\Delta Z$, we have $\rho b = 3.687 - 0.039185 \, \Delta g/\Delta Z$.

* * * * *